United States Patent [19]

Harvey

[11] 4,314,751
[45] Feb. 9, 1982

[54] TAKE-UP SPOOL ADVANCING MECHANISM FOR A PHOTOGRAPHIC CAMERA

[75] Inventor: Donald M. Harvey, Webster, N.Y.

[73] Assignee: Eastman Kodak Company, Rochester, N.Y.

[21] Appl. No.: 223,956

[22] Filed: Jan. 12, 1981

[51] Int. Cl.³ .............................................. G03B 1/06
[52] U.S. Cl. .................................................. 354/212
[58] Field of Search ............... 354/275, 288, 217, 218, 354/212–215, 202, 204, 205, 206; 242/74, 71

[56] References Cited

U.S. PATENT DOCUMENTS

| | | | |
|---|---|---|---|
| 1,947,483 | 2/1934 | Mihalyi | 354/212 |
| 3,377,936 | 4/1968 | Goshima et al. | 354/212 |
| 3,451,322 | 6/1969 | Noda et al. | 354/288 X |
| 3,470,801 | 10/1969 | Lieser et al. | 354/214 |
| 3,481,260 | 12/1969 | Ettischer et al. | 354/212 |
| 3,484,053 | 12/1969 | Rehn et al. | 242/74 |

*Primary Examiner*—Donald A. Griffin
*Attorney, Agent, or Firm*—Doug I. Hague

[57] ABSTRACT

A claw and scotch yoke mechanism operatively interconnects a pivotable camera cover door and a rotatable film take-up spool. As the cover door is moved from its closed position to its opened position to provide access to the camera interior, the claw and yoke cooperate to orient a film capturing member provided on the take-up spool in a position allowing easy attachment of a film strip leader to the take-up spool. As the cover door is moved from its open position to its closed position in preparation for camera operation, the claw and yoke mechanism again cooperate to rotate the take-up spool in a film advancing direction to absorb any slack in the film.

5 Claims, 7 Drawing Figures

TAKE-UP SPOOL ADVANCING MECHANISM FOR A PHOTOGRAPHIC CAMERA

BACKGROUND OF THE INVENTION

1. Field of the Invention

The present invention relates to photographic cameras of the type employing an elongated film strip supplied in a film cassette and, more particularly, to apparatus for facilitating the loading of an elongated filmstrip in a camera.

2. Description Relative to the Prior Art

To load most 35 mm cameras, the camera operator must insert a film cassette into a film supply chamber, pull the film leader out of the cassette, position the film leader along film guide rails that cooperate with other camera structure to define a film passageway extending between the film supply chamber and a film take-up chamber and manually attach the end of the film leader to a film take-up spool. One problem frequently encountered during this portion of the film loading procedure is that the take-up spool slot or other mechanism for attaching the film to the take-up spool is not oriented in a convenient position for film leader attachment. This problem can be overcome by manually indexing the take-up spool to a proper orientation, but such an operation is time consuming and requires both visual observation and operator dexterity.

If the film leader can be attached positively to the take-up spool without creating film slack in the film passageway, there is no need for the camera operator to wind the film around the take-up spool before closing the camera cover door. However, if there is film slack, the camera operator must wind a short length of film manually onto the take-up spool to prevent buckling or misalignment of the film in the film passageway when the cover door is closed. This procedure is also time consuming and with an inexperienced operator may result in the winding of sufficient film onto the take-up spool so that one or more exposure frames are lost.

One solution to the problem of properly orienting the take-up spool for attachment of the film leader is suggested by U.S. Pat. No. 3,470,801. At the end of the film rewind operation, a detent arrangement arrests the take-up spool in a position such that, upon opening of the camera cover door, a film insertion slot provided in the take-up spool is substantially parallel to the film guide rails.

One solution to the problem of film slack removal is shown in U.S. Pat. No. 3,481,260 wherein an auxiliary film winding mechanism interconnects the camera cover door and the take-up spool and rotates the take-up spool to wind film thereon in response to the closing of the cover door.

The disadvantage of the apparatus disclosed in each of the aforementioned two patents is that they are single purpose mechanisms. That is to say, such apparatus can be operated to eliminate one film loading problem (either orientation of the take-up spool or removal of film slack), but neither apparatus alone can be operated to eliminate both film loading problems.

U.S. Pat. No. 1,947,483 discloses a folding camera adapted for use with a specially constructed, two-part roll full magazine. This film magazine is adapted to be received in the camera by a pair of movably mounted devices that are interconnected with the cover door. When the cover door is closed, the holding devices separate the two magazine parts so as to stretch the film contained therein across the camera exposure frame. When the cover door is opened, the holding devices reunite the two magazine parts in a light-tight manner in preparation for removal from the camera. While the apparatus of U.S. Pat. No. 1,947,483 avoids both of the previously mentioned film loading problems, it suffers the disadvantages of (1) requiring an unorthodox loading procedure, (2) using a specially constructed film magazine that (3) can be used only with cameras specifically designed for use therewith.

SUMMARY OF THE INVENTION

The present invention provides a single, apparatus, adapted for use with standard film cassettes, which both orients the take-up spool to a convenient film attaching position as the camera cover door is moved to its open position and rotates the take-up spool to remove initial film slack as the cover door is moved to its closed position. In a preferred embodiment of the invention, this is accomplished by a first coupling member operatively associated with the camera cover door and adapted to rotate in a first direction in response to the movement of the cover door to its open position and in a second direction in response to the movement of the cover door to its closed position; a mechanism coupled to the first coupling member for translating the rotational movements of the first coupling member into reciprocating movement, and a second coupling member coupled between the translating mechanism and the take-up spool for translating the reciprocating movement into unidirectional rotation of the take-up spool.

The invention and its features and advantages will become more apparent by referring to the accompanying drawings and to the ensuing detailed description of the preferred embodiment.

DETAILED DESCRIPTION OF THE PREFERRED EMBODIMENT

Because photographic cameras and film cassettes are well known, the present description will be directed in particular to elements forming part of or cooperating more directly with, apparatus in accordance with the present invention. It is to be understood that camera elements and cassette elements not specifically shown or described may take various forms well known to those having skill in the art.

Figure 1:
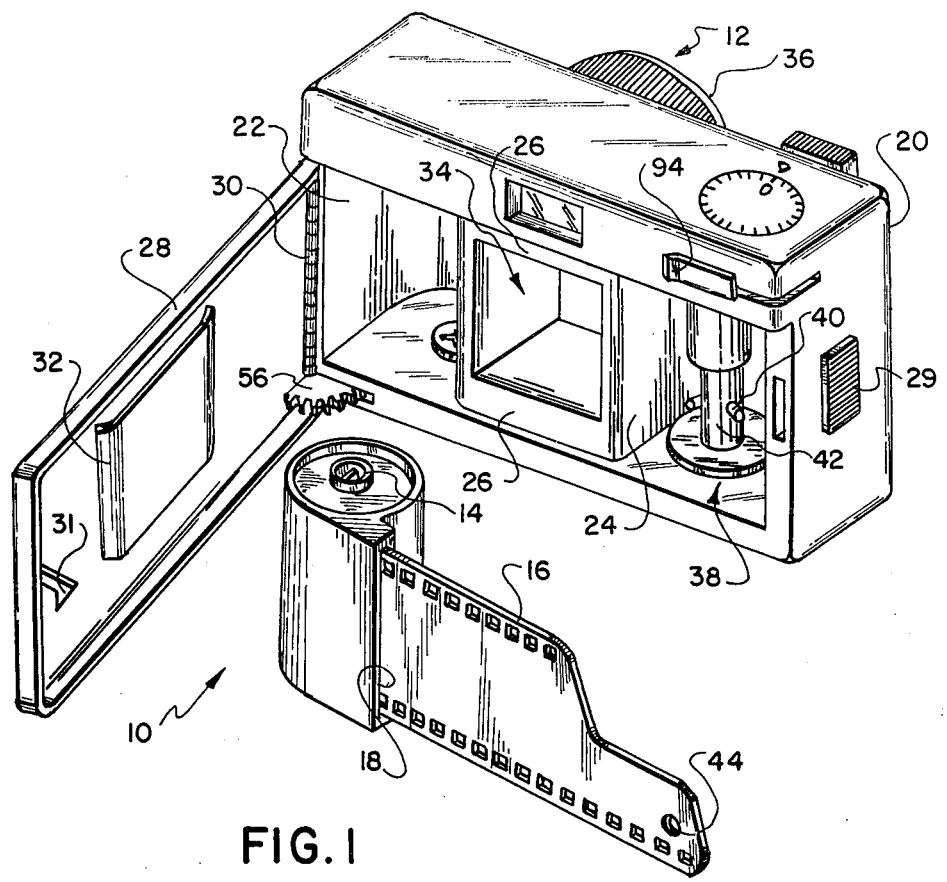
FIG. 1 is a perspective view of a film cassette with a film leader extending therefrom and of a photographic camera for use therewith according to the invention.
Figure 2:
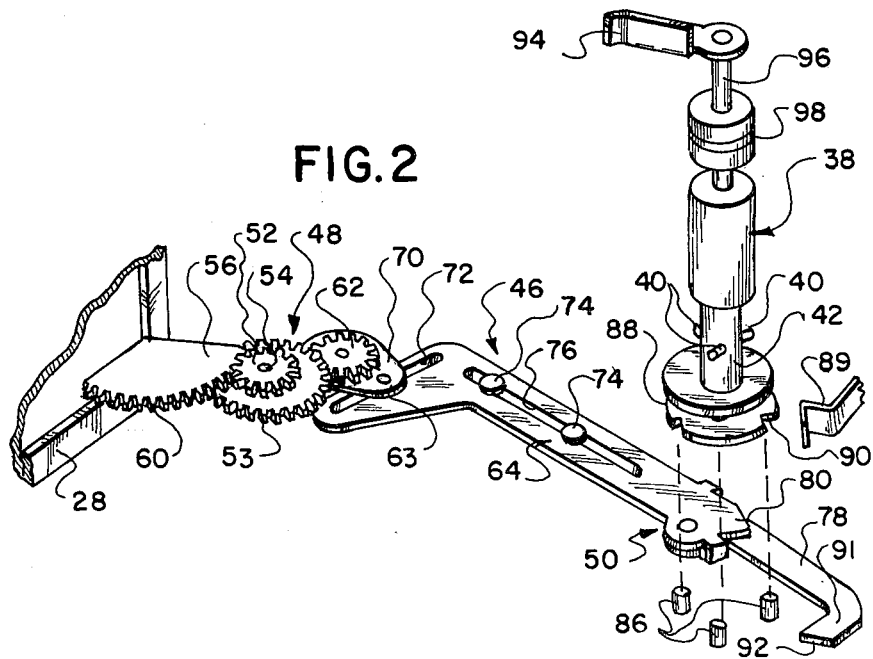
FIG. 2 is an exploded view of the take-up spool orientation and initial film advancing mechanism.

FIG. 1 of the drawing shows a film cassette 10 in a position for insertion into a camera 12. The cassette 10 contains a roll of strip film coiled upon a spool 14 and having an elongated film leader 16 extending through a light-tight slot 18. Camera 12 includes a body portion 20 having a film supply chamber 22 and a film take-up chamber 24 arranged on opposite sides of a pair of film guide supports 26. A camera cover door 28 is attached to the camera body 20 by a hinge 30. When the cover door 28 is closed, the guide supports 26 cooperate with a pressure plate 32 mounted on the interior of the door 28, to define a film passageway 34 extending between the supply and the take-up chambers. This passageway maintains the film in a flat, properly oriented position in a focal plane of a camera objective lens 36.

A film take-up spool 38 is rotatably mounted in a conventional manner in the film take-up chamber 24. The take-up spool 38 is provided with means well known in the camera art for attaching the leading end of the film leader 16 thereto. In one illustrative embodiment shown in the drawings, such attaching means comprises a plurality of film capturing posts 40 positioned at equally spaced intervals about the core 42 of the take-up spool 38. To attach the film leader 16 to the take-up spool 38, the camera operator pulls the film leader 16 out of the cassette 10, positions the leader over one of the capturing posts 40 and then pushes the film leader downwardly so that the film capturing post 40 protrudes upwardly through an aperture 44 provided in the leading end of the film leader. It is to be understood that other film attaching means could likewise be employed, e.g. one or more slots provided in the take-up spool into which the film leader 16 is inserted by the camera operator.

The take-up spool orientating and initial advancing mechanism, comprising the present invention, includes a scotch yoke mechanism 46, a first coupling member 48 operatively coupling the scotch yoke mechanism to the cover door 28 and a second coupling member 50 operatively coupling the scotch yoke mechanism 46 to the take-up spool 38.

Figure 3A:
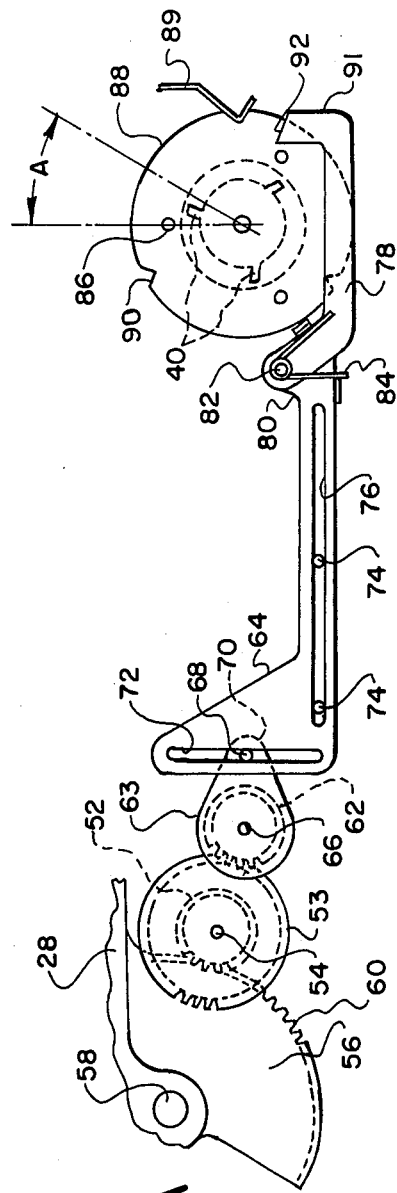
FIGS. 3A, 3B, 3C, and 3D are fragmentary sectional views illustrating the various positions of the take-up spool orientating and initial film advancing mechanism during the film loading procedure.

The first coupling member 48 comprises a compound gear consisting of spur wheel gears 52 and 53 mounted for free rotation on a shaft 54 journaled in the camera body 20 and a sector gear 56 mounted to the cover door 28 in concentric relation to door hinge pin 58. The gear segment 60 of sector gear 56 is in meshing engagement with the gear 52. As the cover door 28 is moved from its close position, shown in FIG. 3A, to its open position, shown in FIG. 3D, the sector gear 56 rotates in a counterclockwise direction and rotates the gear 52 in a clockwise direction. As the cover door 28 is moved from its open position back to its closed position, the movements of the gears 52 and 56 are reversed, i.e. the sector gear 56 rotates in a clockwise direction and rotates the gear 52 in a counterclockwise direction.

The scotch yoke mechanism 46 comprises a gear 62, a crank arm 63 and a yoke plate 64 which converts the rotational movements of the first coupling member 48 into reciprocating movement. The gear 62 and crank arm 63 are mounted on a shaft 66 journaled in the camera body 20 so that the gear is in meshing engagement with the spur wheel gear 53. A pin 68 is mounted on the face 70 of the crank arm 63 and extends through a vertical slot 72 provided in the yoke plate 64. The yoke plate 64 is slidably mounted on the camera body 20 by a pair of pins 74 which cooperate with a horizontal slot 76 provided in the yoke plate 64. The meshing engagement of the gears 53 and 62 causes the gear 62, the crank arm 63 and the pin 68 to rotate in a counterclockwise direction as the cover door 28 moves from its closed position to its open position and to rotate in a clockwise direction as the cover door 28 moves from its open position to its closed position. As the pin 68 rotates in either its counterclockwise or clockwise directions, the pin 68 and shuttle slots 72 and 76 cooperate to convert the rotational pin movement into reciprocating yoke movement. Advantageously, the reciprocating movement of the scotch yoke mechanism 46 is identical for both counterclockwise and clockwise rotation of the pin 68. Thus, as the cover door 28 is moved from its closed position shown in FIG. 3A towards its open position shown in FIG. 3D, the scotch yoke mechanism first moves to left until the door 28 is approximately halfway open as shown in dashed lines in FIG. 3C and then moves to the right as shown in FIGS. 3C and 3D until the door 28 reaches its open position. Similarly, as the cover door 28 is moved from its open position towards its closed position, the scotch yoke mechanism first moves to the left until the cover door is approximately halfway closed and then moves to the right until the door 28 reaches its closed position.

The second coupling member 50 constitutes a means for translating the reciprocating movement of the scotch yoke mechanism 46 into unidirectional film advancing (clockwise) rotation of the take-up spool 38. In the illustrative embodiment shown in the drawings, the second coupling member 50 includes a claw 78 pivotably attached to the end 80 of the yoke plate 64 by a pin 82. A spring 84 biases the claw 78 for counterclockwise rotation into engagement with one of a plurality of pins 86, each located adjacent a film capturing post 40 and projecting outwardly from an end plate 88 of the take-up spool 38. The number of pins 86 must correlate with the number of film capturing posts 40 (three in the illustrated embodiment), however, it is to be understood that camera design consideration that play no part in the present invention determine the number of film capturing posts, or other film leader attachment mechanisms provided.

Figure 3B:
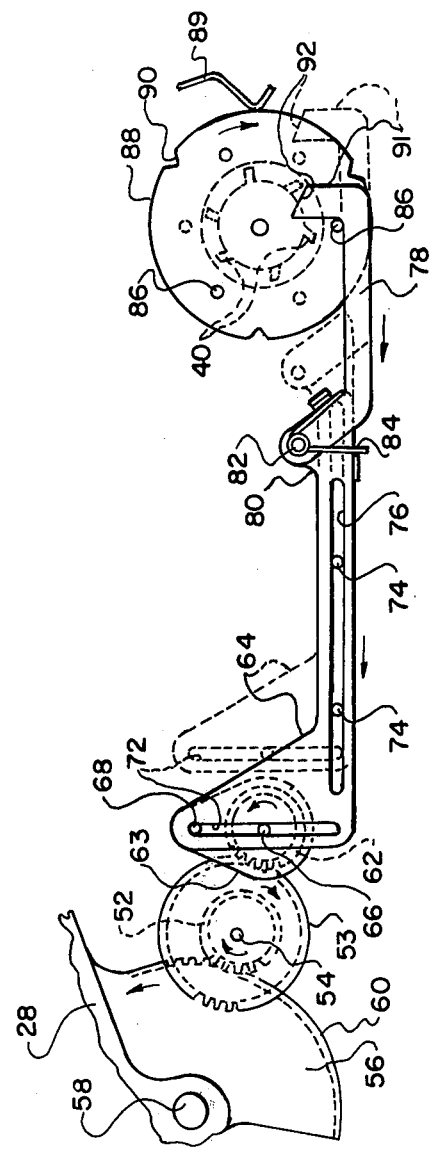
Figure 3C:
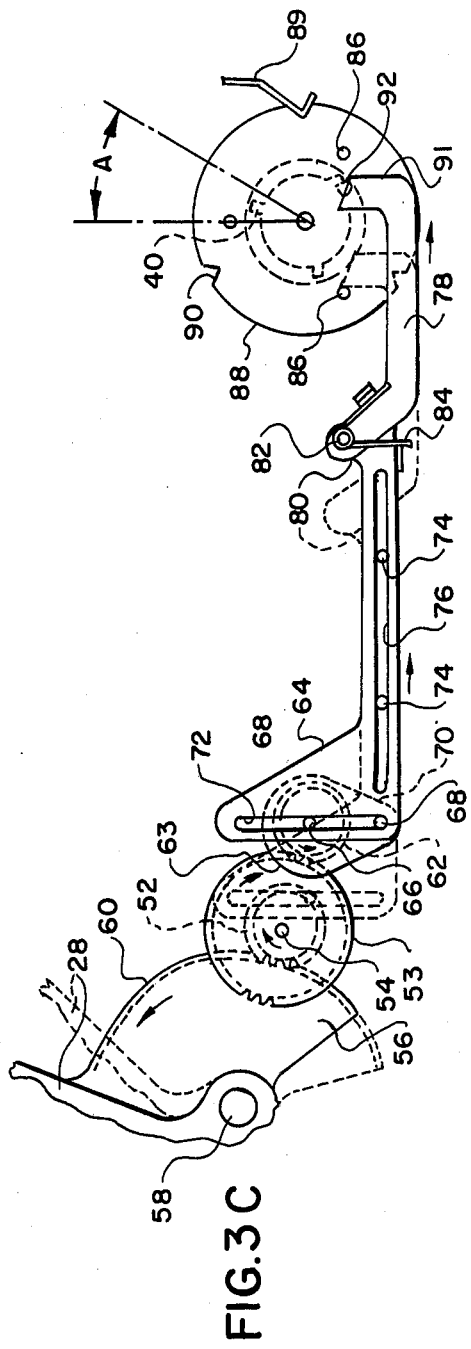
Figure 3D:
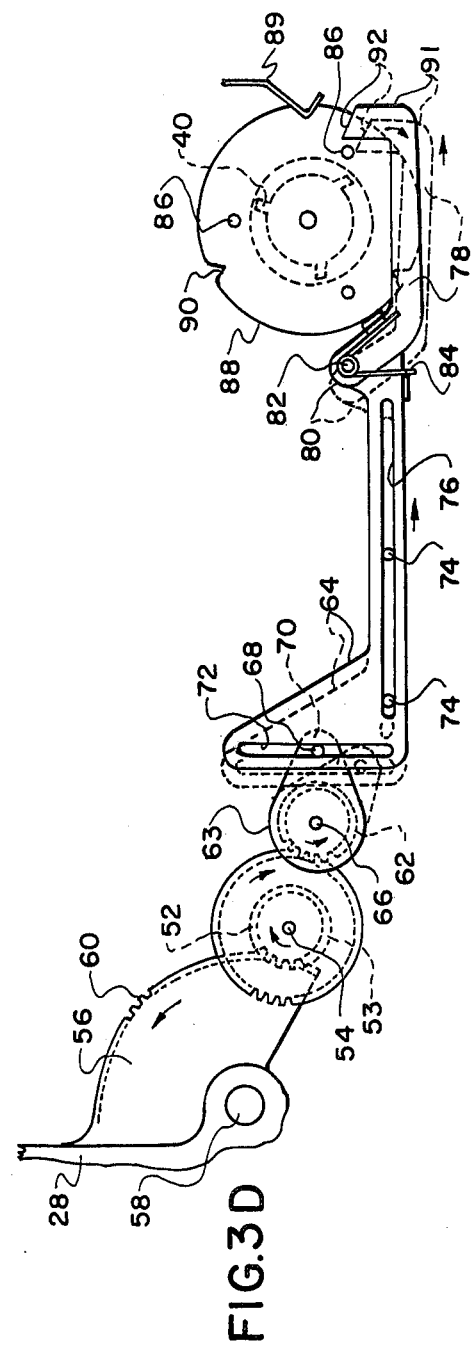

When the yoke plate 64 is moved to the left as shown in FIGS. 3B and 3C, the engagement of a claw hook 91 with one of the pins 86 causes the take-up spool 38 to rotate in a clockwise direction. However, when the yoke plate moves to the right as shown in FIGS. 3C and 3D, an inclined surface 92 on the claw hook 91 moves into engagement with the pin 86. The take-up spool 38 is prevented from rotating counterclockwise during the rightward yoke plate movement by the engagement of a spring biased arm 89 in a detent 90 provided in the end 88 of the take-up spool 38. As a result, engagement of the hook surface 92 with the pin 86 forces the claw 78 to rotate in a clockwise direction about the pivot pin 82 against the bias of the spring 84 thereby allowing the pin 86 to overrun the claw 78. Alternatively, counterclockwise rotation of the take-up spool 38 can be prevented by a pawl and ratchet mechanism (not shown). During the rewind of the film strip back into the film cassette 10, such pawl and ratchet mechansim would, of course, be disabled.

In operation, the camera operator depresses a camera lock button 29 to release a cover door latch 31 and then opens the cover door 28 to permit the insertion of a film cassette 10 into the supply chamber 22. As the camera cover door 28 is moved from its closed position shown in FIG. 3A to its open position shown in FIG. 3D, the sector gear 56 and the yoke gear 62 rotate in a counterclockwise direction and the spur wheel gears 52 and 53 rotate in a clockwise direction. The gear tooth ratio between the sector gear 56 and the yoke gear 62 is selected so that the gear 62 rotates counterclockwise through one complete revolution (360°) in response to the movement of the cover door 28 from its closed to its open position (approximately 90°) and rotates clockwise through another complete revolution in response to the movement of the cover door 28 from its opened to its closed position. During the first 180° of counterclockwise rotation by the gear 62, the yoke plate 64 and the claw 78 move from their initial positions shown in dash lines in FIG. 3B to the left as shown in solid lines. For a portion of the claw's leftward movement, such portion being dependent upon the initial position of the take-up spool 38, the claw hook 91 engages and moves a pin 86, which, in turn, causes the take-up spool 38 to rotate in a clockwise direction. At the end of the claw's leftward movement, i.e. after 180° of rotation, one of the film capturing posts 40 is in the "ideal" region for film attachment, indicated by the letter "A" in FIG. 3C. I have found that locating a film capturing member within a region "A" extending from approximately top center of the take-up spool core 42 through an angle of approximately 30° allows the camera operator to easily attach the film leader 16 to the take-up spool 38. The take-up spool 38 is arrested in the "ideal" film attachment position by the engagement of the spring biased arm 89 in the detent 90 provided in the take-up spool end plate 88. During the second 180° of counterclockwise rotation by the gear 62, the take-up spool 38 remains in the "ideal" film attachment position and the yoke plate 64 and the claw 78 move to the right as shown in FIGS. 3C and 3D. During the rightward movement of the claw 78, the inclined surface 92 of the claw hook 91 engages a pin 86. Because the spring force exerted on the arm 89 is greater than spring force exerted by the spring 84 on the claw 78, this engagement forces the claw 78 to rotate in a clockwise direction about the pin 82 against the bias of the spring 84 thereby allowing the pin 86 to overrun the claw 78 as shown in dash lines in FIG. 3D. Claw 78 then returns to its initial position shown in solid lines.

Figure 4:
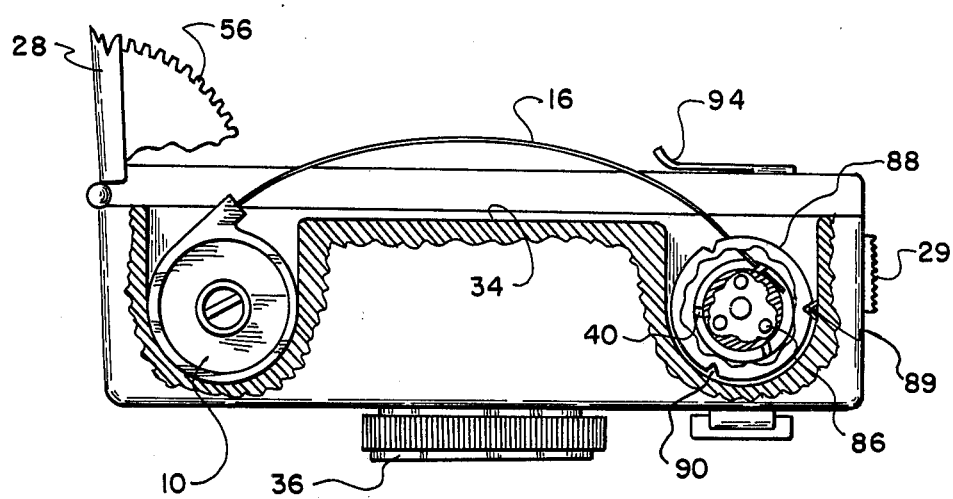
FIG. 4 is a bottom view of the camera shown in FIG. 1, partly broken away, illustrating schematically the position which the film leader may assume after the camera has been loaded but before the cover door has been closed.

As illustrated in FIG. 4, the camera operator, during the process of attaching the film leader 16 to the take-up core 38, may pull an excessive amount of the film leader 16 from the cassette 10. In conventional cameras, this might cause the film to buckle or to be misaligned in the film passageway 34 when the cover door 28 is closed. In accordance with the present invention, however, as the cover door 28 moves from its open position to its closed position, the sector gear 56 and the yoke gear 62 rotate in a clockwise direction and the spur gears 52 and 53 rotate in a counterclockwise direction. The clockwise rotation of the yoke gear 62 through one complete revolution produces the same reciprocating yoke movement as does the counterclockwise rotation of the gear 62. Thus, during the first 180° of clockwise rotation by the yoke gear 62, the yoke plate 64 and the claw 78 move to the left. During some portion of this leftward movement the claw hook 91 engages and moves a pin 86 causing the take-up spool to rotate in a clockwise, film advancing direction and thereby position the next film capturing post 40 in the "ideal" region A. This initial film winding operation serves to draw the film substantially taut across the film passageway 34 and thereby absorb any slack in the film. During the second 180° of clockwise rotation by the yoke gear 62, the yoke plate 64 and the claw 78 move to the right bringing the inclined surface 92 of the claw hook 91 into engagement with a pin 86. As previously noted, this engagement causes the claw 78 to pivot in a clockwise direction and the pin 86 to overrun the claw 78. The spring 84 then returns the claw 78 to its initial position.

The initial film winding described in the preceding paragraph is accomplished during the film loading procedure. Further film advancement for exposure purposes is achieved by means of a conventional film winding lever 94 which is coupled to the take-up spool 38 via a shaft 96 and a one way clutch 98, that is disengageable to permit film rewinding, as is well known in the prior art.

The invention has been described in detail with particular reference to a preferred embodiment thereof, but it will be understood that variations and modifications can be effected within the spirit and scope of the invention. For example, an appropriate ratchet and pawl arrangement could provide the unidirectional rotational to the take-up spool in response to the reciprocating movement of the scotch yoke.

I claim:
1. In a photographic camera adapted for use with a supply of strip film, the camera having (1) a housing, (2) a film take-up spool rotatably mounted in the housing and provided with a film attaching means for securing the leading end of the film to the take-up spool, and (3) a cover door hinged to the housing and movable between an open position wherein the camera interior is accessible for loading and unloading a film supply and a closed position, the improvement comprising:
   take-up spool rotating means interconnecting the cover door and the take-up spool and (1) responsive to movement of the cover door to its open position for rotating the take-up spool to a predetermined rotational position to thereby orient the film attaching means for securing the leading end of the film supply to the take-up spool, and (2) responsive to movement of the cover door to its closed position for rotating the take-up spool through a predetermined angle to thereby wind film on the take-up spool.

2. The improvement according to claim 1 wherein the take-up spool rotating means includes:
   (a) a first coupling member operatively associated with the cover door and adapted to be moved, (1) in a first direction of rotation in response to the movement of the cover door to its open position and (2) in a second direction of rotation in response to movement of the cover door to its closed position;
   (b) scotch yoke means coupled to the first coupling means for translating the rotational movements of the first coupling means into reciprocating movement; and
   (c) a second coupling member coupled to the yoke means and the take-up spool and adapted to impart unidirectional rotation to the take-up spool in response to the reciprocating movement of the yoke mechanism.

3. The improvement according to claim 2 wherein the second coupling member comprises:
   (a) at least one pin extending outwardly from the take-up spool;
   (b) a pivotable claw member provided with a pin capturing surface adapted to engage and rotate the pin during movement of the yoke means in a first direction and an inclined pin disengaging surface adapted to be engaged and pivoted by the pin during movement of the yoke means in a second direction; and (c) spring means for resiliently urging the claw member into engagement with the pin.

4. The improvement according to claim 2 wherein the first coupling means comprises:
(a) a rotatable gear operatively connected to the yoke means; and
(b) a gear segment connected to the cover door in meshing engagement with the rotatable gear.

5. A camera adapted for use with photographic strip film, said camera comprising a housing, a film take-up spool rotatably mounted in the housing, film attaching means supported on the perimeter of the take-up spool for securing the leading end of the film to the take-up spool, a cover door hinged to the housing and movable between an open position wherein the camera interior is accessible for loading and unloading a supply of film, and a closed position, reciprocating means coupled to the cover door and driven during the opening and closing movements thereof in identical cycles, and unidirectional clutch means operatively interconnecting the reciprocating means and the take-up spool for rotating the take-up spool in a film-winding direction in response to each cycle of the reciprocating means.

* * * * *